United States Patent
Chavez

(10) Patent No.: US 9,900,352 B2
(45) Date of Patent: Feb. 20, 2018

(54) SIP NETWORK BORDER ELEMENT SESSION AUGMENTATION

(71) Applicant: Avaya Inc., Santa Clara, CA (US)

(72) Inventor: David L. Chavez, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 399 days.

(21) Appl. No.: 14/597,966

(22) Filed: Jan. 15, 2015

(65) Prior Publication Data

US 2016/0212192 A1  Jul. 21, 2016

(51) Int. Cl.
  *G06F 15/16* (2006.01)
  *H04L 29/06* (2006.01)
  *H04M 15/00* (2006.01)

(52) U.S. Cl.
  CPC ...... *H04L 65/1069* (2013.01); *H04L 65/1006* (2013.01); *H04L 65/102* (2013.01); *H04M 15/56* (2013.01)

(58) Field of Classification Search
  CPC .................. H04L 65/1006; H04L 65/1069
  See application file for complete search history.

(56) References Cited

U.S. PATENT DOCUMENTS

2007/0220302 A1* 9/2007 Cline .................. G06F 11/2035
  714/4.1
2014/0169226 A1* 6/2014 Ginde ................. H04L 65/1006
  370/259

OTHER PUBLICATIONS

Camarillo et al., "The Early Session Disposition Type for the Session Initiation Protocol (SIP)," RFC 3959, Network Working Group, Dec. 2004, retrieved from http://tools.ietf.org/html/rfc3959, 12 pages.
Houser, "SIP Trunking Drives Business Growth, Flexibility, Cost Savings," Enterprise Communications, Aug. 1, 2014, retrieved from http://www.enterprisecommunicationshub.com/articles/385552-sip-trunking-drives-business-growth-flexibility-cost-savings.htm, 1 page.
Okumura et al., "Session Initiation Protocol (SIP) Usage of the Offer/Answer Model," RFC 6337, Internet Engineering Task Force (IETF), Aug. 2011, retrieved from http://tools.ietf.org/html/rfc6337, 33 pages.

\* cited by examiner

*Primary Examiner* — Yves Dalencourt
(74) *Attorney, Agent, or Firm* — Sheridan Ross P.C.

(57) ABSTRACT

When SIP INVITE is received from a first communication device at a Network Border Element (NBE), the NBE sends the SIP INVITE to a communication manger to establish a SIP communication session with a second communication device. As part of the call setup process, a SIP 200 OK message is received by the NBE, thus setting up a full SIP communication session between the NBE and the second communication device. The SIP 200 OK message includes a parameter that indicates the SIP communication session is initially going to be established between the first communication device and a non-human entity. Based on the parameter in the SIP 200 OK message, the NBE sends a SIP Provisional Response message to the first communication device. This sets up a provisional SIP communication session between the NBE and the first communication device in order to comply with the jurisdictional requirements of a specific country.

20 Claims, 3 Drawing Sheets

SIP NETWORK BORDER ELEMENT SESSION AUGMENTATION

TECHNICAL FIELD

The systems and methods disclosed herein relate to communication systems and in particular to Session Initiation Protocol (SIP) communication systems.

BACKGROUND

In a Session Initiation Protocol (SIP) system, as part of the call setup procedure, there are typically two ways that calls can be connected. In a first procedure, the system can respond to a SIP INVITE with a SIP 200 OK message. The SIP 200 OK message indicates that the SIP INVITE was successful and the call is setup. In a second procedure, the system can respond to a SIP INVITE with a SIP 183 Session in Progress Message (or another SIP Provisional Response message). The SIP 183 Session in Progress message allows extra information to be sent while the call is still being setup. In cases where the SIP 183 Session in Progress message is sent, the call is still in a provisional state and is not considered fully setup under the SIP protocol. After the SIP 183 Session in Progress message is sent, a SIP 200 OK message will be sent when the call is fully setup.

The procedure of always of sending a SIP 200 OK message in response to a SIP INVITE works fine in countries where billing begins when the initial call is being setup. However, some countries require that billing for a calling party can only begin when the calling party is connected to a human. In these countries, connection to non-human entities, such as, an Interactive Voice Response (IVR) system requires sending the SIP 183 Session in Progress Message instead of the SIP 200 OK message. When the calling party is eventually connected to a human, the SIP 200 OK message is sent to indicate that the calling party has been connected to a human. A service provider can then use the SIP 183 Session in Progress message and the SIP 200 OK message to provide proper billing.

The model of sending the SIP 183 Session in Progress message when the call is being connected to a non-human entity can cause reliability issues. When the SIP 183 Session in Progress message is sent, the call is considered under SIP rules, not fully setup. If a failure occurs, such as a proxy supporting the call fails, the call is not able to fail over to a second proxy because the call is still in a provisional state. This results in the call being dropped. What is needed is a solution that allows the provisional call to not be dropped when there is a failure prior to the call being fully setup.

SUMMARY

Systems and methods are provided to solve these and other problems and disadvantages of the prior art. When a SIP INVITE is received from a first communication device at a Network Border Element (NBE), the NBE sends the SIP INVITE to a communication manger to establish a SIP communication session with a second communication device. As part of the call setup process, a SIP 200 OK message is received by the NBE, via the communication manager, thus setting up a full SIP communication session between the NBE and the second communication device. The SIP 200 OK message includes a parameter that indicates the SIP communication session is initially going to be established between the first communication device and a non-human entity. Based on the parameter in the SIP 200 OK message, the NBE sends a SIP Provisional Response message to the first communication device. This sets up a provisional SIP communication session between the NBE and the first communication device in order to comply with the jurisdictional requirements of a specific country, for example.

DETAILED DESCRIPTION

Figure 1:
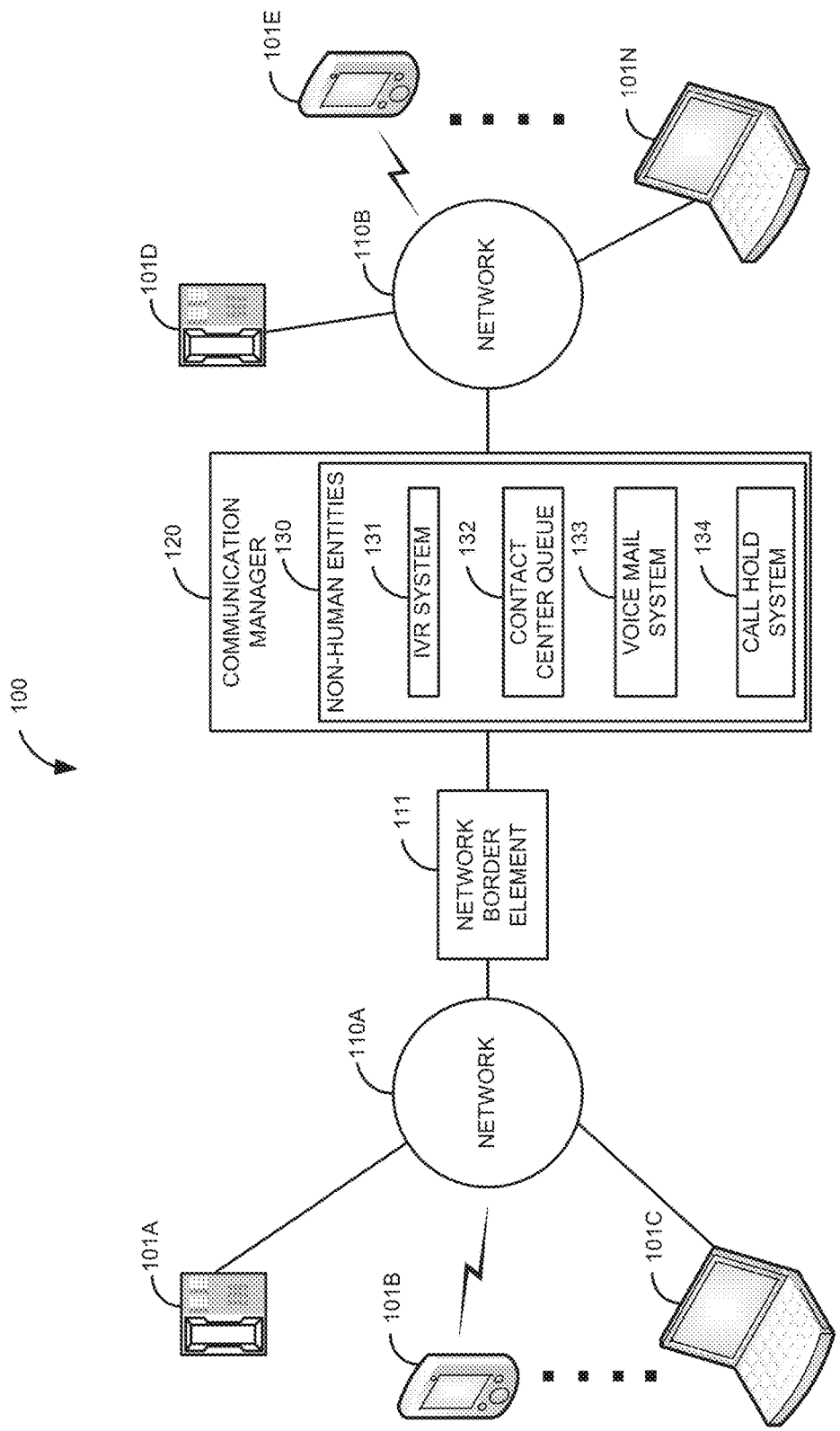
FIG. 1 is a block diagram of a first illustrative system for managing SIP messages.

FIG. 1 is a block diagram of a first illustrative system 100 for managing SIP messages. The first illustrative system 100 comprises communication devices 101A-101N, networks 110A-110B, a Network border element (NBE) 111, and communication manager 120.

The communication devices 101A-101N can be or may include any user device that can communicate on the networks 110A-110B, such as a Personal Computer (PC), a telephone, a video phone, a cellular telephone, a Personal Digital Assistant (PDA), a tablet device, a notebook device, a smart phone, a server, a switch, and the like. Any number of communication devices 101A-101N may be connected to either of the networks 110A-110A, including only a single communication device 101 connected to each of the networks 110A-110B. In addition, the communication device 101 may be directly connected to the communication manager 120.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, an enterprise network, a combination of these, and the like. The networks 110A-110B can use a variety of electronic protocols, such as Ethernet, Internet Protocol (IP), Session Initiation Protocol (SIP), Integrated Services Digital Network (ISDN), and the like. Thus, the networks 110A-110B are electronic communication networks that allow for sending of messages via packets and/or circuit switched communications. In one embodiment, the network 110A is the Internet/PSTN and the network 110B is an enterprise/private network.

The Network Border Element (NBE) 111 can be or may include any hardware/software that can manage communication sessions between the network 110A and the communication manager 120. The NBE 111 can include various elements, such as a Network Address Translator (NAT), a firewall, a gateway for converting protocols, a Session Border Controller (SBC), and/or the like. In one embodiment, the NBE 111 is a separate hardware device that resides on a server. In another embodiment, the NBE 111 is connected to both the networks 110A-110B.

The communication manager 120 can be or may include any hardware/software that can manage communication sessions, such as a Private Branch Exchange, a switch, a router, a session manager, and/or the like. The communication manager 120 can manage various types of communications, such as, voice communications, video communications, Instant Messaging (IM) communications, text communications, and/or the like.

The communication manager 120 further comprises non-human entities 130. The non-human entities 130 can be or may include any hardware/software that can establish a communication session with a person. In this illustrative embodiment, the non-human entities 130 comprises Interactive Voice Response (IVR) system 131, contact center queue 132, voice mail system 133, and call hold system 134. Although only four non-human entities 130 are defined in FIG. 1, one of skill in the art would recognize that the non-human entities 130 can include other non-human entities.

The IVR system 131 can be or may include any hardware/software that can interact with a person, such as a voice IVR, a video IVR, and/or the like. In one embodiment, the IVR system 131 may include the ability to interact via text. The IVR system 131 may be included as part of the communication manager 120 or may be separate from the communication manager 120. For example, the IVR system 131 can be on a separate server.

The contact center queue 132 can be or may include any hardware/software that can hold incoming contacts (i.e., voice, video, instant messaging, etc.) while the contact is waiting to be processed. The contact center queue 132 may be included as part of the communication manager 120 or may be separate from the communication manager 120. For example, the contact center queue 132 may be in a separate contact center system.

The voice mail system 133 can be or may include any hardware/software that can provide voice mail services. The voice mail system 133 may be included as part of the communication manager 120 or may be separate from the communication manager 120. For example, the voice mail system 133 can be on a separate voice mail server.

The call hold system 134 can be or may include any hardware/software that can provide call hold services. For example, the call hold system 134 can provide music on hold while the calling party is waiting to be connected to an agent in a contact center. The call hold system 134 may be included as part of the communication manager 120 or may be separate from the communication manager 120. For example, the call hold system 134 may be on a separate contact center system.

FIG. 1 is reflective of control signaling to setup a call. In typical SIP protocol messaging, the media path (e.g., for the voice of a voice call) follows the most direct path.

Figure 2:
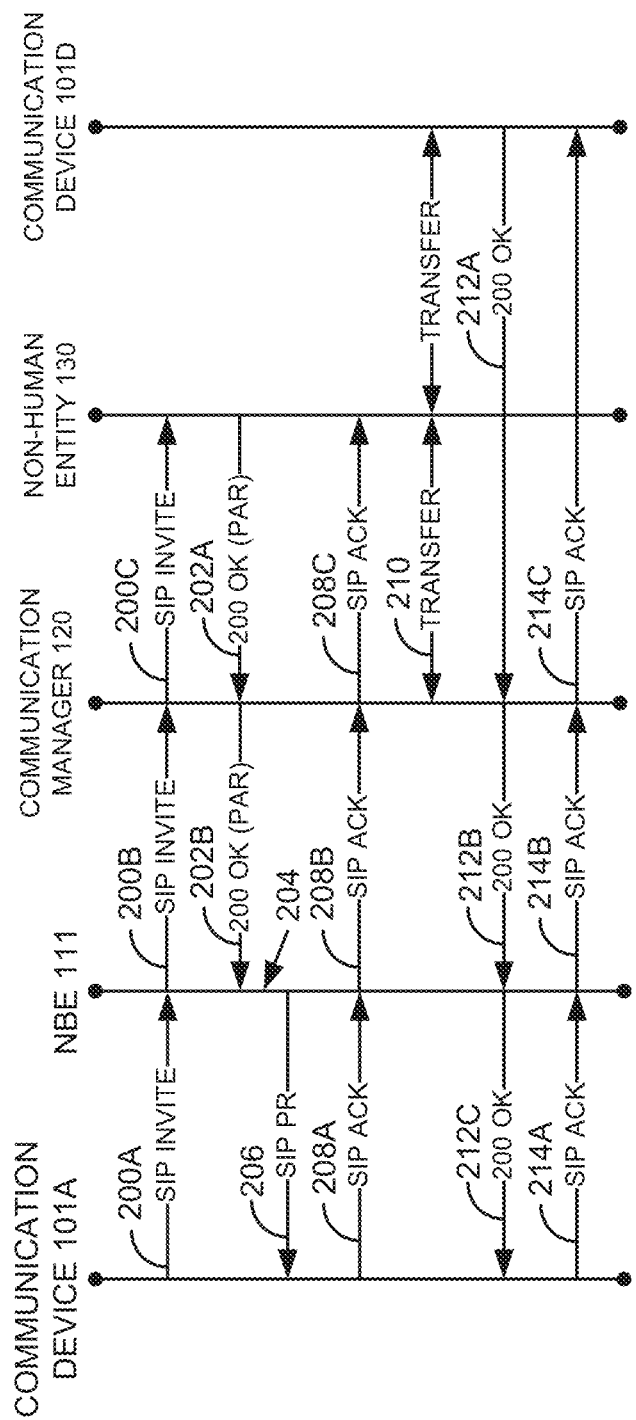
FIG. 2 is a flow diagram of a process for managing SIP messages when a SIP communication is transferred from a non-human entity to a human entity.
Figure 3:
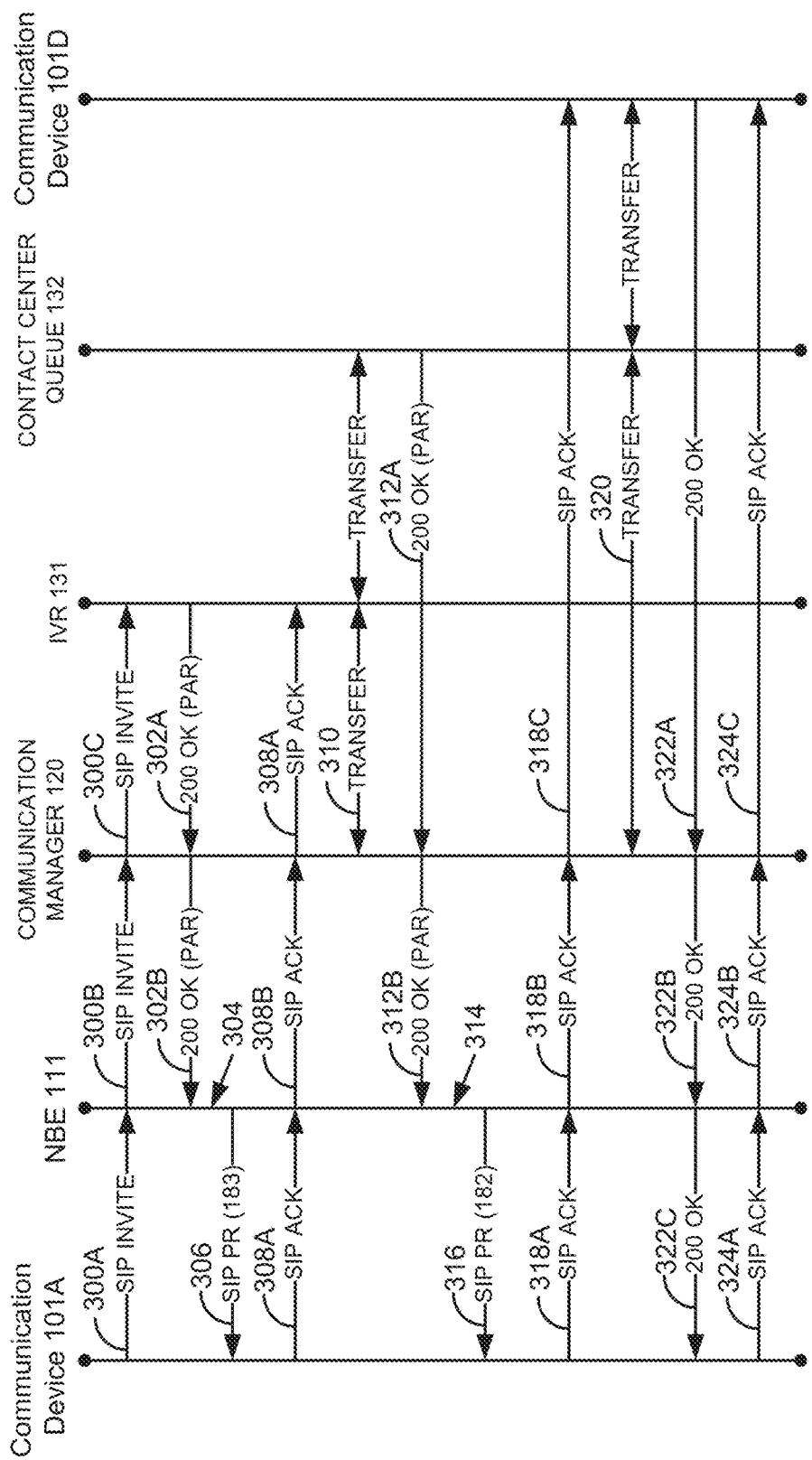
FIG. 3 is a flow diagram of a process for managing SIP messages when a SIP communication session is transferred between multiple non-human entities and a human entity.

FIG. 2 is a flow diagram of a process for managing SIP messages when a SIP communication is transferred from a non-human entity 130 to a human entity. Illustratively, the communication devices 101A-101N, the NBE 111, the communication manager 120, the non-human entities 130, the IVR system 131, the contact center queue 132, the voice mail system 133, and the call hold system 134 are stored-program-controlled entities, such as a computer or processor, which performs the method of FIGS. 2-3 and the processes described herein by executing program instructions stored in a non-transient computer readable storage medium, such as a memory or disk. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process begins in step 200A where the communication device 101A sends a SIP INVITE message to establish a SIP communication session between the communication device 101A and another communication device 101. For example, a person at communication device 101A makes a voice call (could also be a video or Instant Messaging call) to a contact center to talk to an agent at the communication device 101. In another embodiment, the communication device 101A can be an analog phone on the PSTN, which calls a central office. The central office can provide the SIP INVITE on behalf of the communication device 101A. The NBE 111 receives the SIP INVITE in step 200A. The NBE 111 sends the SIP INVITE to the session manager 120 in step 200B. The session manager 120 sends the SIP INVITE to the non-human entity 130 in step 200C. For example, the communication manager 120 may route the incoming call to the IVR system 131.

The non-human entity 130 can optionally respond with a SIP 200 OK message to the communication manager 120 that includes a parameter that indicates the SIP communication session is initially going to be established with the non-human entity 130 in step 202A. In another embodiment, the non-human entity 130 can send a regular SIP 200 OK message without the parameter in step 202A. The communication manger 120 receives the SIP 200 OK message in step 202A. If the SIP 200 OK message of step 202A has the parameter, the communication manager 120 passes the SIP 200 OK message with the parameter to the NBE 111 in step 202B. Otherwise, if the SIP 200 OK message of step 202A does not contain the parameter, the communication manager 120 includes the parameter in the SIP 200 OK message sent to the NBE in step 202B.

The parameter sent in the SIP 200 OK message of steps 202A-202B can be defined in different ways. In one embodiment, the parameter only indicates that the SIP communication session is initially going to be established with a non-human entity 130. The parameter can be included in different ways in the SIP 200 OK message. For example, the parameter can be in a specific SIP header or in a proprietary SIP header. Alternatively, the parameter can be in the payload of the SIP 200 OK message.

In another embodiment, the parameter in the SIP 200 OK message can indicate a specific type of SIP Provisional Response message for the NBE 111 to send. The types of SIP Provisional Response messages indicated by the parameter can be at least one of three types: 1) a SIP 180 Ringing message, 2) a SIP 182 Queued message, and 3), a SIP 183 Session in Progress message. The specific type of SIP Provisional Response message can be based on various conditions and/or rules. For example, the SIP 200 OK message can indicate a specific type of SIP Provisional Response message based on the SIP communication session being connected to the IVR 131, the SIP communication session being placed on hold, the SIP communication session being placed on hold with music, the SIP communication session being placed in a queue in a contact center (e.g., the SIP 182 Queued message), an expected wait time in the contact center, a time of day when the SIP INVITE is received, a number of calls waiting in the contact center, the SIP communication session being sent to voice mail, and/or the like.

The NBE 111 receives the SIP 200 OK message sent in step 202B. The NBE 111, in step 204, detects the parameter in the SIP 200 OK message. In response to detecting the parameter in step 204, the NBE 111 sends a SIP Provisional Response message to the communication device 101A (or to a communication device 101 in the network 110A, such as, a switch or proxy server that sent the SIP INVITE in step 200A) in step 206. If the parameter does not indicate a specific type of SIP Provisional Response message, the NBE 111 can send the SIP Provisional Response message based on one or more rules. For example, the one or more rules can include a rule that defines the type of SIP Provisional Response message to send based on a communication address of a sender of the first SIP 200 OK message (i.e., based a list of addresses associated with non-human entities 130), a rule that defines the type of SIP Provisional Response message to send based on a number of SIP request messages (e.g., SIP INVITES) received at the NBE 111, a rule that specifies a single type of SIP Provisional Response message, a rule that specifies a specific type of SIP Provisional Response message based on a country or jurisdiction, a rule that specifies a specific type of SIP Provisional Response message based on a service provider, and/or the like.

In another embodiment, neither of the SIP 200 OK messages sent in steps 202A-202B contain the parameter. Instead, the SIP 200 OK messages are regular SIP 200 OK messages. When the NBE 111 receives the regular SIP 200 OK message in step 202B, the NBE determines, in step 204, that the SIP 200 OK message was sent from the non-human entity 130. For example, the NBE 111 can be administered with the IP addresses of all non-human entities 130. When the SIP 200 OK message is received, the NBE 111 can look at the sender's IP address to see if the sender's IP address is in the list of IP addresses of the non-human entities 130. If the sender's IP address is in the list of IP addresses of the non-human entities 130, the NBE sends the SIP Provisional Response message based on a defined rule in step 206. For example, a rule defined by a service provider.

The advantage to this approach is that the software in the communication manager 120/non-human entities 130 does not have to be modified to send the SIP 200 OK messages with the parameter. In other words, only the NBE 111 will need to have a software update. This process will can also be applied to steps 304 and 314 of FIG. 3.

In response to receiving the SIP Provisional Response message sent in step 206, the communication device 101A sends a SIP ACK in step 208A to the NBE 111. The NBE 111 sends the SIP ACK to the communication manger 120 in step 208B. The communication manager 120 sends the SIP ACK to the non-human entity 130 in step 208C. At this point, a fully setup SIP communication session has been established between the non-human entity 130 and the NBE 111 (courtesy of the SIP 200 OK message sent in steps 202A-202B). However, a provisional SIP communication session has been established between the NBE 111 and the communication device 101A (courtesy of the SIP Provisional Response message sent in step 206). Thus, compliance with jurisdictional laws (e.g., in a specific country) are accomplished from an external perspective, while internally, a full SIP communication session has been established to provide for better fault tolerance.

Typically, some point in time, the SIP communication session is transferred from the non-human entity 130 to the communication device 101D (a human entity's communication device 101) in step 210. For example, the calling party selects a menu from the IVR 131 to transfer the call to an agent. As part of the standard SIP transfer process, the communication device 101D sends a regular SIP 200 OK message to accept the transfer in step 212A. The SIP 200 OK message is a regular SIP 200 OK message because the message does not have the parameter, thus, in this example indicating that the transfer is to a human entity (e.g., an agent). The communication manger 120 receives the SIP 200 OK message in step 212A and sends the SIP 200 OK message to the NBE 111 in step 212B. The NBE 111 receives the SIP 200 OK message sent in step 212B. The NBE 111, because the SIP 200 OK message is a regular SIP 200 OK message without the parameter (or not in the list of IP addresses of non-human entities 130), sends the SIP 200 OK message to the communication device 101A in step 212C. The communication device 101A sends a SIP ACK in step 214A to the NBE 111. The NBE 111 sends the SIP ACK to the communication manager 120 in step 214B. The communication manager 120 sends the SIP ACK to the communication device 101D in step 214C.

At this point, the external call is now fully setup because of the SIP 200 OK message sent in step 212C. The calling party can now be charged for the call established to the human entity (a person at the communication device 101D).

To illustrate, consider the following examples. John Doe, at communication device 101A want to make a call to discuss a problem with the computer he purchased from company XYZ. The product lists a 1-800 number to call. John calls the 1-800 number. This results in the SIP INVITE being sent (steps 200A-200C). Joe is connected to the IVR system 131. The IVR system 131 sends the SIP 200 OK message with the parameter in step 202A. The parameter in the SIP 200 OK message of step 202A indicates a specific type of SIP Provisional Response message (the SIP 183 Session in Progress message). The SIP 200 OK message with the parameter is received by the communication manager 120 in step 202A. The communication manager 120 sends the SIP 200 OK message with the parameter to the NBE 111 in step 202B. The NBE 111 detects the parameter in the SIP 200 OK message in step 204. The NBE 111 sends the SIP Provisional Response message 183 Session in Progress to the communication device 101A in step 206. The communication device 101A sends the SIP ACK (steps 208A-208C). After answering questions, the IVR system 131 transfers the voice call to an agent at the communication device 101E in step 210. The transfer results in a standard SIP 200 OK message being sent to the communication device 101A from the communication device 101E (steps 212A-212C). The communication device 101A sends the SIP ACK in step 214A. The SIP ACK is received at the communication device 101E (step 214B-214C). John Doe hangs up and the call is terminated (e.g., by the communication device 101A sending a SIP BYE message (not shown)).

As a second example, John Doe, at the communication device 101B, wants to call his friend, Jane Doe at communication 101E. Jane has directed all her calls to be sent to the voice mail system 133. John Doe calls Jane Doe, resulting in the SIP INVITE in step 200A-200C. The voice mail system 133 sends a regular SIP 200 OK message in step 202A. The communication manager 120 adds the parameter indicating that the SIP communication session is going to be initially established with a non-human entity 130 (voice mail system 133) in step 202B. In this example, the parameter in the SIP 200 OK message does not indicate a type of SIP Provisional Response message to send. The NBE 111 receives the SIP 200 OK message sent in step 202B. The NBE 111 detects the parameter indicating that the SIP communication session is initially going to be established with a non-human entity 130 (voice mail system 133) in step 204. The NBE 111, based on a rule, sends a SIP 183 Session in Progress message to the communication device 101B. John Doe leaves his message for Jane Doe and then hangs up. At this point the call is torn down. In this example, the call between the communication device 101B and the NBE 111 is always in a provisional state.

The above embodiments are all described where the communication manager 120 is involved setting up the SIP communication session. However, the above descriptions will also work in a peer-to-peer environment without the communication manager 120. In this embodiment, the messages that are normally forwarded by the communication manager 120 go directly from the NBE 111 to the non-human entity 130/communication device 101D or from the non-human entity 130/communication device 101D to the NBE 111.

In one embodiment, after the SIP communication session has been setup between the communication device 101A and the non-human entity 130, in step 208C and a provisional SIP communication session has been setup between the NBE 111 and the communication device 101A, the communication manger 120 (or a backup communication manager 120 or other network element) can detect a failure of a network component in the SIP communication session. A network component can be any device/software involved in the SIP communication session, such as the communication manager 120, the non-human entity 130, the NBE 111, a SIP proxy server, a Back-to-Back User Agent (B2BUA), and/or the like. The communication manager 120 or other network element can then recover the SIP communication session by failing over the SIP communication session between the NBE 111 and the non-human entity 130 around the failed network component (i.e., through a backup network component or by bypassing the failed network component). This failover process can also be used for the method of FIG. 3.

FIG. 3 is a flow diagram of a process for managing SIP messages when a SIP communication session is transferred between multiple non-human entities 130 and a human entity. The process begins in step 300A where the communication device 101A sends a SIP INVITE message to establish a SIP communication session between the communication device 101A and another communication device 101. The NBE 111 receives the SIP INVITE in step 300A. The NBE 111 sends the SIP INVITE to the session manager 120 in step 300B. The session manager 120 sends the SIP invite to the IVR system 131 in step 300C.

The IVR system 131 can optionally respond with a SIP 200 OK message to the communication manager 120 that includes a parameter that indicates the SIP communication session is initially going to be established with the non-human entity (IVR system 131) in step 302A. In another embodiment, the non-human entity (IVR system 131) can send a regular SIP 200 OK message without the parameter in step 302A. The communication manger 120 receives the SIP 200 OK message in step 302A. If the SIP 200 OK message of step 302A has the parameter, the communication manager 120 passes the SIP 200 OK message with the parameter to the NBE 111 in step 302B. Otherwise, if the SIP 200 OK message of step 302A does not contain the parameter, the communication manager 120 includes the parameter in the SIP 200 OK message sent to the NBE 111 in step 302B.

The NBE 111 receives the SIP 200 OK message sent in step 302B. The NBE 111, in step 304, detects the parameter in the SIP 200 OK message. In response to detecting the parameter in step 304, the NBE 111 sends a SIP Provisional Response message to the communication device 101A (or to a communication device 101 in the network 110A, such as, a switch or proxy server that sent the SIP INVITE in step 300A) in step 306. The SIP Provisional Response message can be indicated by the parameter or can be determined based on one or more defined rules (i.e., like those discussed previously). In this example, the NBE 111 sends a SIP 183 Session in Progress message in step 306. In response to receiving the SIP Provisional Response message sent in step 306, the communication device 101A sends a SIP ACK in step 308A to the NBE 111. The NBE 111 sends the SIP ACK to the communication manger 120 in step 308B. The communication manager 120 sends the SIP ACK to the non-human entity 130 in step 308C.

At some point in time, the SIP communication session is transferred from the non-human entity (IVR system 131) to another non-human entity (contact center queue 132) in step 310. For example, after answering some questions, the calling party is transferred to the contact center queue 132 to wait to talk to an agent of the contact center. As part of the standard SIP transfer process, the contact center queue 132 sends a SIP 200 OK message with the parameter in step 312A. In this example, the parameter indicates to send the SIP Provisional Response message 182 Queued message. The communication manager 120 receives the SIP 200 OK message with the parameter in step 312A. The communication manager 120 sends the SIP 200 OK message with the parameter in step 312B.

The NBE 111 receives the SIP 200 OK message sent in step 312B. The NBE 111, in step 314, detects the parameter in the SIP 200 OK message. In response to detecting the parameter in step 314, the NBE 111 sends a SIP Provisional Response message to the communication device 101A (or to a communication device 101 in the network 110A, such as, a switch or proxy server that sent the SIP INVITE in step 300A) in step 316. In this example, since the SIP 200 OK message indicates to send the SIP 182 Queued message, the NBE 111 sends the SIP 182 Queued message in step 316. In response to receiving the SIP Provisional Response message sent in step 316, the communication device 101A sends a SIP ACK in step 318A to the NBE 111. The NBE 111 sends the SIP ACK to the communication manger 120 in step 318B. The communication manager 120 sends the SIP ACK to the communication device 101D in step 318C.

The SIP communication session is transferred from the non-human entity (contact center queue 132) to the communication device 101D (a human entity's communication device 101) in step 320. For example, as an agent becomes available, the calling party is transferred from the contact center queue 132 to the agent. As part of the standard SIP transfer process, the communication device 101D sends a regular SIP 200 OK message to accept the transfer in step 322A. The SIP 200 OK message is a regular SIP 200 OK message because the message does not have the parameter, thus indicating that the transfer is to a human entity (the agent). The communication manger 120 receives the SIP 200 OK message in step 322A and sends the SIP 200 OK message to the NBE 111 in step 322B. The NBE 111 receives the SIP 200 OK message sent in step 322B. The NBE 111, because the SIP 200 OK message is a regular SIP 200 OK message without the parameter, sends the SIP 200 OK message to the communication device 101A in step 322C. The communication device 101A sends a SIP ACK in step 324A to the NBE 111. The NBE 111 sends the SIP ACK to the communication manager 120 in step 324B. The communication manager 120 sends the SIP ACK to the communication device 101D in step 324C.

At this point, the external call is now fully setup because of the SIP 200 OK message sent in step 322C. The calling party can now be charged for the call established to the human entity (an agent at the communication device 101D).

The above embodiments are all described where the communication manager 120 is involved setting up the SIP communication session. However, the above description will also work in a peer-to-peer environment without the communication manager 120. In this embodiment, the messages that are normally forwarded by the communication manager 120 go directly from the NBE 111 to the non-human entity 130/communication device 101D or from the non-human entity 130/communication device 101D to the NBE 111.

In FIGS. 2 and 3, the functionality of sending provisional response messages is performed by the NBE 111. In one embodiment, this functionality is implemented using a SIP B2BUA. This allows above described functionality to be dynamically loaded based on an administrative procedure.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing Session Initiation Protocol (SIP) messages comprising:
   receiving, by a microprocessor, a SIP INVITE, from a first communication device, to establish a SIP communication session between the first communication device and a second communication device;
   receiving, by the microprocessor, a first SIP 200 OK message, wherein the first SIP 200 OK message includes a parameter that indicates the SIP communication session is to be initially established between the first communication device and a first non-human entity;
   detecting, by the microprocessor, the parameter in the first SIP 200 OK message; and
   in response to detecting the parameter in the first SIP 200 OK message, sending, by the microprocessor, a first SIP Provisional Response message to the first communication device.

2. The method of claim 1, wherein the first SIP Provisional Response message is at least one of: a SIP 180 Ringing message, a SIP 182 Queued message, or a SIP 183 Session in Progress message.

3. The method of claim 1, further comprising:
   receiving a second SIP 200 OK message based on the SIP communication session being transferred from the first non-human entity to a second non-human entity, wherein the second SIP 200 OK message includes the parameter; and
   in response to receiving the second SIP 200 OK message, sending a second SIP Provisional Response message to the first communication device.

4. The method of claim 3, wherein the first SIP Provisional Response message is a different type of SIP Provisional Response message than the second SIP Provisional Response message.

5. The method of claim 1, wherein the parameter in the first SIP 200 OK message indicates a specific type of SIP Provisional Response message to send.

6. The method of claim 5, wherein the parameter in the first SIP 200 OK message is set based on at least one of the following conditions:
   the SIP communication session being connected to an Interactive Voice Response (IVR) system;
   the SIP communication session being placed on hold;
   the SIP communication session being placed on hold with music;
   the SIP communication session being placed in a queue in a contact center;
   an expected wait time in the contact center;
   a time of day when the SIP INVITE is received;
   a number of calls waiting in the contact center; or
   the SIP communication session being sent to voice mail.

7. The method of claim 1, wherein the parameter in the first SIP 200 OK message does not indicate a type of SIP Provisional Response message to send.

8. The method of claim 7, further comprising: determining a type of SIP Provisional Response message to send based on one or more rules.

9. The method of claim 8, wherein the one or more rules comprise at least one of the following:
   a rule that defines the type of SIP Provisional Response message to send based on a communication address of a sender of the first SIP 200 OK message;
   a rule that defines the type of SIP Provisional Response message to send based on a number of SIP request messages received at a Network border element;
   a rule that specifies a single type of SIP Provisional Response message;
   a rule that specifies a specific type of SIP Provisional Response message based on a country or jurisdiction; or
   a rule that specifies a specific type of SIP Provisional Response message based on a service provider.

10. The method of claim 1, further comprising:
    receiving a second SIP 200 OK message, wherein the second SIP 200 OK message does not include the parameter and wherein the second SIP 200 OK message is sent based on the first communication device being connected to a human-entity; and
    sending the second SIP 200 OK message to the first communication device.

11. The method of claim 1, further comprising:
    detecting a failure of a network component involved in the SIP communication session; and
    in response to detecting the failure of the network component involved in the SIP communication session, failing over the SIP communication session.

12. A system for managing Session Initiation Protocol (SIP) messages comprising:
    a microprocessor; and
    a computer readable medium, coupled with the microprocessor and comprising microprocessor readable and executable instructions that cause the microprocessor to:
    receive a SIP INVITE, from a first communication device, to establish a SIP communication session between the first communication device and a second communication device;
    receive a first SIP 200 OK message, wherein the first SIP 200 OK message comprises a parameter that indicates the SIP communication session is initially going to be established between the first communication device and a first non-human entity;
    detect the parameter in the first SIP 200 OK message; and send a SIP Provisional Response message to the first communication device in response to detecting the parameter in the first SIP 200 OK message.

13. The system of claim 12, wherein the parameter in the first SIP 200 OK message indicates a specific type of SIP Provisional Response message to send.

14. The system of claim 12, wherein the parameter in the first SIP 200 OK message does not indicate a type of SIP Provisional Response message to send.

15. The system of claim 12, wherein the executable instructions further cause the microprocessor to:
receive a second SIP 200 OK message, wherein the second SIP 200 OK message does not include the parameter and wherein the second SIP 200 OK message is sent based the first communication device being connected to a human-entity; and
send the second SIP 200 OK message to the first communication device.

16. The system of claim 12, wherein the executable instructions further cause the microprocessor to:
determine that the SIP communication session will initially be between the first communication device and a non-human entity; and
send the first SIP 200 OK message in response to determining that the SIP communication session will initially be between the first communication device and the first non-human entity.

17. A system for managing Session Initiation Protocol (SIP) messages comprising:
a microprocessor; and
a computer readable medium, coupled with the microprocessor and comprising microprocessor readable and executable instructions that cause the microprocessor to:
receive a SIP INVITE, from a first communication device, to establish a SIP communication session between the first communication device and a second communication device;
receive a SIP 200 OK message;
determine that the SIP 200 OK message was sent from a non-human entity; and
send a SIP Provisional Response message to the first communication device in response to determining that the SIP 200 OK message was sent from the non-human entity.

18. The system of claim 17, wherein the first SIP Provisional Response message is at least one of: a SIP 180 Ringing message, a SIP 182 Queued message, or a SIP 183 Session in Progress message.

19. The system of claim 17, wherein the executable instructions further cause the microprocessor to determine a type of SIP Provisional Response message to send based on one or more rules.

20. The system of claim 19, wherein the one or more rules comprises a rule that defines the type of SIP Provisional Response message to send based on a communication address of a sender of the first SIP 200 OK message.

* * * * *